United States Patent [19]

Tromponi

[11] 3,996,829
[45] Dec. 14, 1976

[54] ANGULAR SHEARING MACHINE FOR LAMINATES, SUCH AS SHEET METAL

[76] Inventor: Gianfranco Tromponi, Via Bezzecca, 4, Bologna, Italy

[22] Filed: Feb. 23, 1976

[21] Appl. No.: 660,544

[52] U.S. Cl. .................................. 83/522; 83/374; 83/559; 83/618; 83/635; 83/639; 83/693; 83/694; 83/696; 83/917

[51] Int. Cl.² ......................................... B26D 7/26

[58] Field of Search ............ 83/522, 374, 559, 618, 83/635, 639, 693, 694, 696, 917

[56] References Cited

UNITED STATES PATENTS

| | | | |
|---|---|---|---|
| 716,876 | 12/1902 | Dunn | 83/696 |
| 3,157,898 | 11/1964 | Sprague, Jr. | 83/696 X |

*Primary Examiner*—Frank T. Yost
*Attorney, Agent, or Firm*—Guido Modiano; Albert Josif

[57] ABSTRACT

Adjustable cutting angle shearing machine for laminates comprising a pair of shoulder members of substantially C-like shape. The upper ends of the shoulder members are hinged to a supporting frame along a vertical axis. There are provided guides in the shoulder members extending parallel to the shoulder member hinge axis for the sliding movement of respective movable cutter supporting plates whereon the cutters are arranged so as to define an angle the apex whereof is aligned with the hinge axis. Actuating means are provided for lowering and raising the movable cutter supporting plates and an angular position adjusting means for the shoulder members.

4 Claims, 4 Drawing Figures

ANGULAR SHEARING MACHINE FOR LAMINATES, SUCH AS SHEET METAL

BACKGROUND OF THE INVENTION

This invention relates to an angular shearing machine for laminates, such as sheet metal, with adjustable shearing angle features.

It is a primary object of the invention to provide an angular shearing machine of the type mentioned above which is of strong construction and capable of withstanding the very high stresses involved during the shearing or cutting step and of operating with the utmost accuracy.

SUMMARY OF THE INVENTION

This object is achieved by a shearing machine, according to the invention, characterized in that it comprises a pair of shoulders extending in vertical planes and having a first upper horizontal portion and a second lower horizontal portion connected to each other by a third portion such as to define a substantially C-like shape, said horizontal portion having the ends hinged to a supporting frame along a vertical axis, wherein the upper horizontal portions are provided with guides extending parallel to the shoulder hinge axis for the sliding movement of respective movable cutter supporting plates whereon the cutters are arranged so as to define an angle the apex whereof is aligned with said hinge axis, said movable cutters cooperating with fixed cutters attached to the lower portions and substantially coplanar with a backing plate surface for the laminate being sheared, and wherein an actuating means is provided for lowering and raising the movable cutter supporting plates and an angular position adjusting means for said shoulders.

BRIEF DESCRIPTION OF THE DRAWINGS

Further features of the invention will become apparent from the ensuing description of an embodiment thereof with reference to the accompanying drawings, where:

FIG. 3 is a sectional view taken along the line III—III of FIG. 2; and

FIG. 4 is a sectional view taken along the line IV—IV of FIG. 2.

DESCRIPTION OF PREFERRED EMBODIMENTS

Figure 1:
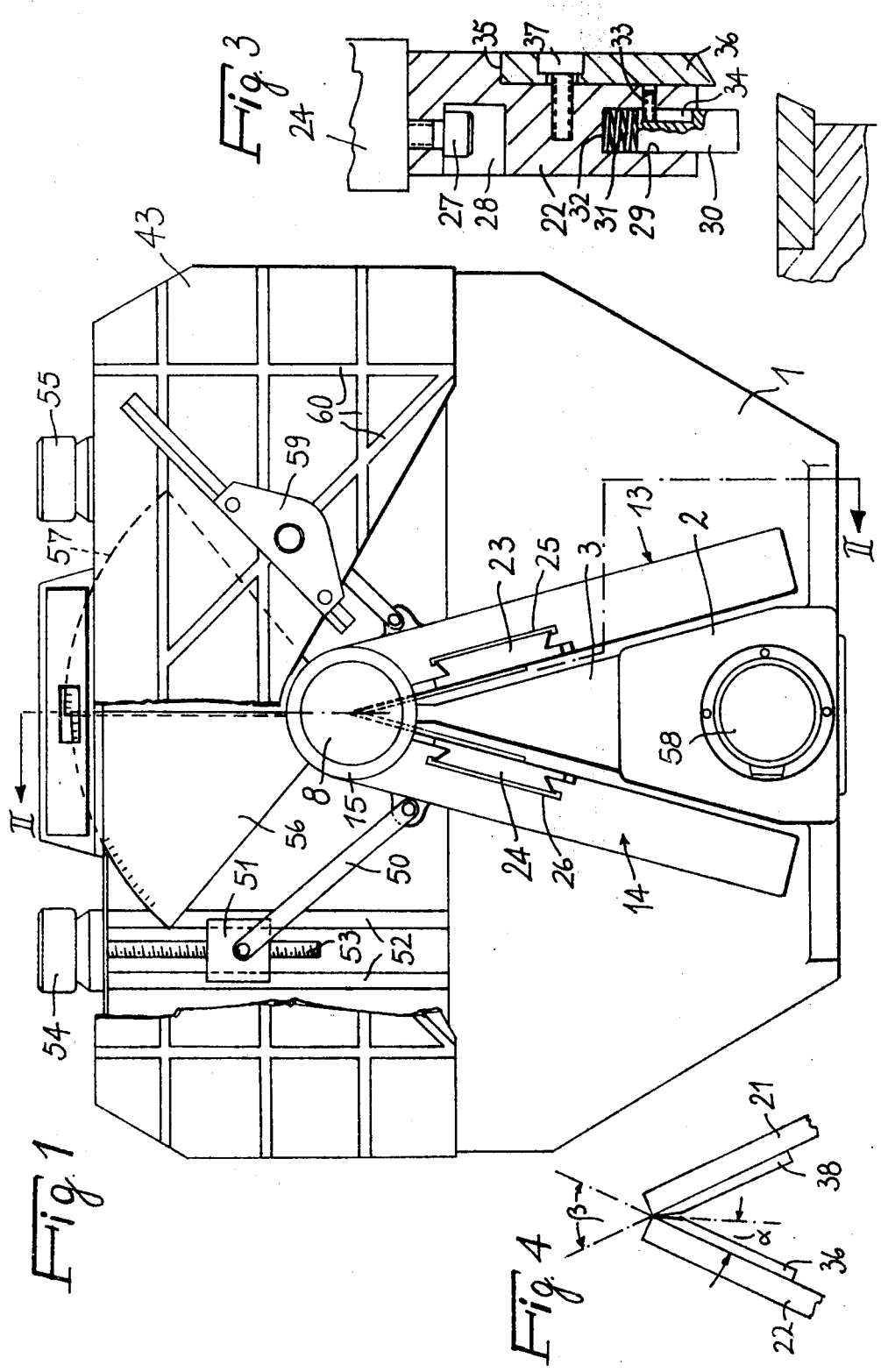
FIG. 1 is a top plan view of the instant shearing machine, partially cut away to evidence some inner members thereof.
Figure 2:
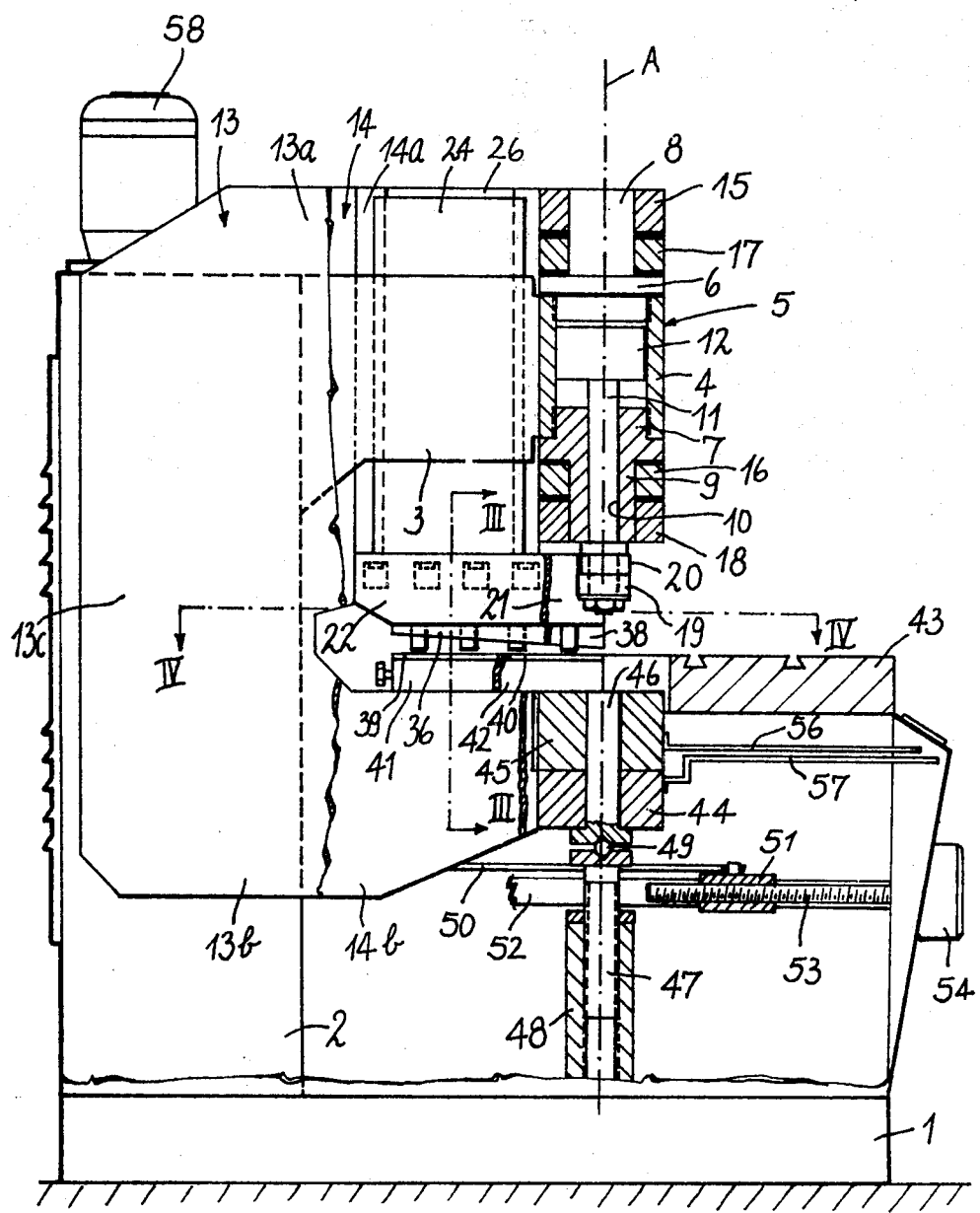
FIG. 2 is an elevational view of a section taken along the line II—II of FIG. 1.

In the drawing figures, the reference numeral 1 identifies the base of the shearing machine frame which further comprises an upright 2 projecting upward from the base rear part and carrying at the top a bracket 3 which projects cantilever fashion from the shearing machine front. The bracket 3 is configurated like a wedge tapering toward the front, whereto the cylinder 4 of a hydraulic ram, generally identified by 5, is affixed. The cylinder 4 is closed at its top and bottom ends by two caps 6,7 screw connected to the cylinder. The caps 6,7 are provided with respective cylindrical tail pieces or stub shafts 8,9, coaxially arranged to each other and aligned along the axis A shown in dot and dash lines in FIG. 2. The bottom cap 7 is formed with an axial bore 10 which extends through the stub shaft 9 and wherein the ram stem or rod 11 is guided, the end whereof within the cylinder 5 is attached to a piston 12.

Two shoulders 13,14 are hinge connected to the stub shafts 8,9 along the axis A, such shoulders being comprised of vertical plates of substantially C-like configuration. More specifically, each shoulder comprises an upper portion 13a,14a carrying the pair of movable cutters of the shearing machine, and a lower portion 13b,14b which carries the fixed or stationary cutters, to be described hereinafter. The upper and lower portions are interconnected together by a third portion 13c,14c at the shearing machine rear end.

The shoulder 13,14 are linked to the stub shafts 8,9 by means of rings or collars 15,16, integral with the shoulder 14, and of rings or collars 17,18, integral with the shoulder 13. Suitable thrust washers of an antifriction material are provided between adjacent rings or collars. To the lower end of the rod 11, projecting downward from the stub shaft 9, two rings 19,20 are hinge connected which are affixed to two cutter carrying or supporting vertical plates 21,22. The rings 19,20 are held in position by a collar in the rod 11 and a nut threaded onto the latter.

The plates 21,22 are attached to respective gibs 23,24 guided within grooves 25,26 in the shoulders. The grooves 25,26 lay parallel to the axis A and are formed with a dovetail cross-section which is complementary to that of the gibs 23,24.

The plate 22 (and similarly the plate 21) is affixed to the lower head of the gib 24 by means of bolts 27 inserted into recesses 28 of the plate itself (see FIG. 3). In the plate 22, moreover, there are formed dead holes 29, vertical and open toward the bottom, wherein hold downs 30 are housed whereon springs 31 act intervening between the hold downs and the bottoms 32 of the holes 29. The hold downs are effective to retain the laminate or plate before and during the shearing step and are prevented from coming off their respective holes by a through pin 33 threaded into the plate 22 and engaging with a groove 34 in each hold down.

On the face of the plate 22 which extends internally with respect to the angle defined by the shoulders 13,14, a shoulder portion 35 is formed for a cutter 36 affixed to the plate by means of screws 37. The cutter of the plate 22 (and similarly the cutter 38 of the other plate 21) has its cutting edge arranged to slope downward and toward the front.

The cutters 36,38 define the cutting angle and are chamfered at their meeting line such that the apex of the angle subtended thereby is aligned with the axis A. Furthermore, as best shown in FIG. 4, the angle $\alpha$ (alpha) defined between the cutting edge and the chamfered face must be smaller than at least half the predetermined minimum shearing angle indicated by $\beta$ (beta).

Fixed counter-cutters 39,40 of the shearing machine cooperate with the cutters 36,38 and are anchored to supports 41,42 which allow for the adjustment thereof with respect to the movable cutters. The adjustment of the supports 41,42 may be implemented in any known manner and is not described herein in any detail. The counter-cutters 39,40 have their cutting edges substantially coplanar with the backing surface or table 43 for the laminates. In order to prevent the high stesses developed during the shearing process in the parts 13a,13b from propagating to the parts 13b,14b, the latter are hinge connected, by means of rings or ears integral therewith to a shaft 46 coaxial to the rod 11.

This shaft 46 is aligned with a further threaded shaft 47, screwed into a sleeve 48 extending vertically from the base 1 whereto it is affixed.

Between the adjacent ends of the shafts 46,47 there is interposed a ball 49 partially received in opposed seats of such ends. It will appear that by suitably adjusting the position of the shaft 47 with respect to the shaft 46, the expansion effort occurring in the shoulders 13,14 during the shearing step is effectively discharged to the base.

To adjust the cutting angle, there is linked to the shoulder 14 the end of a lever 50, which is linked with the other of its ends to a block 51 slidable along horizontal guides 52 in the frame. The block 51 acts as a nut for a threaded rod 53 whereto a control handwheel 54 is attached. A similar device, not shown in the drawings, is provided for adjusting the shoulder 13 angle and is operable by means of the handwheel 55. In order to read the angle value set with the handwheels 54,55 two circular segments are provided which lay on superimposed horizontal surfaces the first whereof is affixed to the ring 45 and the second one to the ring 44, i.e. to the shoulders 14 and 13, respectively. The peripheral edges of the segments 56,57 are provided with an indexed scale showing the degrees of rotation through which the shoulders 13,14 have moved. The total angle value set is determined by the sum of the angles read on the two segments with respect to a control mark. The shearing machine just described is completed by a hydraulic unit 58 for activating the ram 5, installed on the upright 2.

The inventive shearing machine operates as follows.

The cutting angle of the cutters is first adjusted through the handwheels 54,55, and the plate or laminate to be sheared is then placed on the table 43, it being positioned under the cutters with the aid of conventional mounting brackets 59 which are lockable along guiding grooves 60 in the table 43. Subsequently to this, the ram 5 is activated thus causing the plates 21,22 to descend and locking the plate or laminate against the fixed countercutters 39,40 by means of the punches 30. As the rod 11 continues its downward movement, the cutters 36,38 shear the plate or laminate. The cutting occurs first at the apex of the angle defined by the cutters and goes on to a "V" configuration toward the plate or laminate edges.

In practicing the invention, many variations and modifications thereof will occur to the expert in the art. In particular, the adjustment of the cutting angle may be effected through a screw device acting between the shoulders 13,14.

I claim:

1. An adjustable cutting angle shearing machine for laminates characterized in that it comprises a pair of shoulders extending in vertical planes and having a first upper horizontal portion and a second lower horizontal portion connected to each other by a third portion such as to define a substantially C-like shape, said horizontal portion having the ends hinged to a supporting frame along a vertical axis, wherein the upper horizontal portions are provided with guides extending parallel to the shoulder hinge axis for the sliding movement of respective movable cutter supporting plates whereon the cutters are arranged so as to define an angle the apex whereof is aligned with said hinge axis, said movable cutters cooperating with fixed cutters attached to the lower portions and substantially coplanar with a backing plate surface for the laminate being sheared, and wherein an actuating means is provided for lowering and raising the movable cutter supporting plates and an angular position adjusting means for said shoulders.

2. A shearing machine according to claim 1, characterized in that it comprises a vertical upright rigid with a base, a bracket projecting horizontally from said upright top, a hydraulic ram comprised of a cylinder affixed along a vertical axis to the end of said bracket and of a piston the rod whereof extends outwardly and downwardly from said cylinder, said cylinder being closed at its ends by a pair of caps provided with respective vertical stub shafts coaxial with the cylinder rod, whereto are hinged the ends of the shoulder upper portions, a pair of cutter supporting or carrying plates hingedly connected to said rod, each plate being affixed to a gib sliding in a guide of the respective shoulder parallel to the rod axis.

3. A shearing machine according to claim 2, characterized in that the lower portions of the shoulders are hingedly connected to a shaft resting, through a ball, onto a shaft coaxial thereto and screwed in an adjustable manner in a bushing integral with the base.

4. A shearing machine according to claim 1, characterized in that the cutting angle adjusting means comprises, for each shoulder, a lever linked along axes parallel to the shoulder hinge axis, with one end to the shoulder and the opposite end to a block acting as a nut, sliding along horizontal guides and engaged by a threaded rod controlled by a handwheel and which, at the shoulder lower portion ends two circular segments are affixed which lay in superimposed horizontal planes, along the periphery whereof an indexed scale is provided to show the rotation angles through which each shoulder has moved with respect to a control mark.

* * * * *